United States Patent [19]

Ho et al.

[11] Patent Number: 5,270,025
[45] Date of Patent: Dec. 14, 1993

[54] METHODS FOR CONTROLLING $N_2O$ EMISSIONS AND FOR THE REDUCTION OF $NO_x$ AND $SO_x$ EMISSIONS IN COMBUSTION SYSTEMS WHILE CONTROLLING $N_2O$ EMISSIONS

[75] Inventors: Loc Ho, Anaheim; Shih L. Chen, Irvine; William R. Seeker, San Clemente; Peter M. Maly, El Toro, all of Calif.

[73] Assignee: Energy & Environmental Research Corp., Irvine, Calif.

[21] Appl. No.: 858,316

[22] Filed: Mar. 25, 1992

Related U.S. Application Data

[63] Continuation-in-part of Ser. No. 681,687, Apr. 5, 1991, Pat. No. 5,116,584.

[51] Int. Cl.$^5$ .................. C01B 21/00; C01B 17/00; C01B 17/20; B01J 8/00
[52] U.S. Cl. .................. 423/235; 423/239.1; 423/244.07; 423/244.08; 423/351
[58] Field of Search .................. 423/235, 235 D, 351, 423/239, 239 A, 244.07, 244.08

[56] References Cited

U.S. PATENT DOCUMENTS

| | | | |
|---|---|---|---|
| 3,118,727 | 1/1964 | Cohn | 423/239 |
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,350,669 | 9/1982 | Izumi et al. | 423/235 |
| 4,368,057 | 7/1983 | Matthews | 48/197 |
| 4,395,223 | 7/1983 | Okigami et al. | 431/10 |
| 4,743,436 | 5/1988 | Lyon | 423/235 |
| 4,849,192 | 7/1989 | Lyon | 423/235 |
| 4,851,201 | 7/1989 | Heap et al. | 423/235 |
| 4,861,567 | 8/1989 | Heap et al. | 423/235 |
| 4,863,704 | 9/1989 | Epperly et al. | 423/235 |
| 4,863,705 | 9/1989 | Epperly et al. | 423/235 |
| 4,877,743 | 10/1989 | Waugh et al. | 423/235 |
| 5,047,219 | 9/1991 | Epperly et al. | 423/235 |
| 5,048,432 | 9/1991 | Hofman et al. | 423/235 |

FOREIGN PATENT DOCUMENTS

| | | | |
|---|---|---|---|
| 285488 | 3/1979 | Japan | 53/34 |
| 1572118 | 4/1977 | United Kingdom | 53/34 |

OTHER PUBLICATIONS

*Optimization of Reburning for Advanced $NO_2$ Control on Coil-Fired Boilers*, Chen et al., Journal of the Air & Waste Management Association, vol. 30, No. 10, pp. 1375-1379, Oct. 1989.

Primary Examiner—Gregory A. Heller
Attorney, Agent, or Firm—Workman, Nydegger & Jensen

[57] ABSTRACT

Method for controlling $N_2O$ emissions from stationary combustion systems having variable flue gas temperatures are disclosed. The $N_2O$ emissions are controlled by the introduction of a $N_2O$ control agent, such as an alkaline compound, into the effluent stream. In addition, the present invention discloses methods for controlling $N_2O$ emissions from stationary combustion systems having variable flue gas temperatures while reducing $NO_x$ emissions. Use of an $NO_x$ reducing agent and an $N_2O$ control agent, such as urea and monosodium glutamate, enlarges the temperature window for effective selective noncatalytic $NO_x$ reduction while significantly eliminating $N_2O$ emissions commonly experienced with urea injection. Further, the present invention discloses methods for controlling $N_2O$ emissions from stationary combustion systems having variable flue gas temperatures while reducing $SO_x$ emissions. Use of an $NO_x$ reducing agent, an $SO_x$ reducing agent, and an $N_2O$ control agent, such as urea, an alkaline-earth metal compound, and an alkali-metal compound, respectively, enlarges the temperature window for effective $NO_x$ and $SO_x$ reductions while significantly eliminating $N_2O$ emissions.

78 Claims, 5 Drawing Sheets

METHODS FOR CONTROLLING N₂O EMISSIONS AND FOR THE REDUCTION OF NO$_x$ AND SO$_x$ EMISSIONS IN COMBUSTION SYSTEMS WHILE CONTROLLING N₂O EMISSIONS

BACKGROUND

Related Applications

This patent application is a continuation-in-part of copending patent application Ser. No. 07/681,687 filed Apr. 5, 1991, in the names of Shih L. Chen, William R. Seeker, and Loc Ho, entitled "Methods for Enlarging the Useful Temperature Window for NO$_x$ Reduction in Combustion Systems," now U.S. Pat. No. 5,116,584 which application is incorporated herein by specific reference.

The Field of the Invention

The present invention is directed to an improved process for controlling N₂O emissions in combustion systems. More particularly, the present invention is directed to methods for controlling N₂O emissions by introducing a N₂O control agent into the effluent stream. In addition, the processes of the present invention significantly eliminate N₂O emissions while providing a wide temperature window for effective NO$_x$ reduction by the use of an NO$_x$ reducing agent. Further, the processes of the present invention significantly eliminate N₂O emissions while enhancing SO$_x$ reduction by the use of an SO$_x$ reducing agent.

Technology Overview

The combustion of fossil fuels, industrial wastes, and municipal wastes produces significant amounts of NO$_x$ and SO$_x$ which ultimately participate in the formation of photochemical smog and acid rain. In addition to NO$_x$ and SO$_x$, the combustion and incineration processes often produce another class of pollutants, namely, nitrous oxides (commonly referred to as "N₂O"). N₂O is a potential "greenhouse" gas and can also lead to degradation of the stratospheric ozone layer.

There exist many processes for the control of NO$_x$ and SO$_x$ emissions from power plants and incinerators. However, control of N₂O emissions from incinerators is a problem to which no presently available technology provides a fully satisfactory answer. While the amount of N₂O produced by burning fuel or waste can be minimized by managing the combustion process, waste or fuel typically contains substantial amounts of chemically bound nitrogen such that N₂O levels are usually unacceptably high, even with careful control of the combustion process. As a result, some form of post-combustion N₂O control technology must be used.

Whereas the control of N₂O emissions is critical, the control of another class of pollutants—nitrogen oxides (commonly referred to as "NO$_x$")—is also important, and current methods of reducing NO$_x$ emissions result in the formation of high N₂O emissions. While the amount of NO$_x$ produced by burning fuel or waste can be minimized by managing the combustion process, as with N₂O emissions, waste typically contains substantial amounts of chemically bound nitrogen such that NO$_x$ levels are usually unacceptably high, even with careful control of the combustion process. As a result, some form of post-combustion technology must be used which not only controls N₂O emissions, but NO$_x$ emissions as well.

Two types of post-combustion NO$_x$ control technologies are presently available, selective catalytic reduction ("SCR") and selective noncatalytic reduction ("SNCR"). Applications of SCR to incinerators are generally regarded as nonfeasible because waste contains virtually all possible trace impurities and these impurities can act as catalyst poisons.

As a result, SNCR processes have been adopted as the best available NO$_x$ control technology for incinerators. In the usual SNCR process, a nitrogen-containing reducing agent, normally either ammonia (NH₃) or urea (H₂NCONH₂), is contacted with flue gas within a relatively narrow temperature range. The optimum contacting temperature is typically a factor of the reducing agent. A homogeneous gas phase reaction occurs which reduces the NO$_x$ in the flue gas to molecular nitrogen (N₂) and water (H₂O).

In most applications, the performance of the NO$_x$ reduction processes depends primarily on the available reaction time, i.e., the length of time the flue gas spends in the temperature range suitable for NO$_x$ reduction by the chosen reducing agent. For applications in which the available reaction time is less than 0.2 seconds, NO$_x$ reductions in the 60% to 80% range are typically achieved. For applications in which the available reaction time is greater than 0.2 seconds NO$_x$ reductions in the 80% to 90% range have commonly been achieved.

The design of a modern incinerator provides the post-flame gases with a residence time generally greater than 1.0 seconds in the temperature range appropriate to NO$_x$ reduction processes. Hence, one might expect incinerators to be a very favorable application for selective noncatalytic NO$_x$ reduction. Instead, however, NO$_x$ reduction in incinerators is typically only 40% or even less.

The poor performance of NO$_x$ reduction processes on incinerators is, in part, a result of the fact that the temperature of the flue gas in incinerators is more highly e variable than it is in other combustion systems. Waste is inherently a fuel with a highly variable BTU content. This variability causes the temperature of the flue gases downstream of the combustion zone to be nonhomogeneous in space and to fluctuate in time.

If the temperature of the flue gas is a little too low at the point where the reducing agent is injected, slight or no NO$_x$ reduction occurs. If the temperature is too high, the nitrogen-containing reducing agent (NH₃ or H₂NCONH₂) has some tendency to oxidize to produce NO$_x$, and the net reduction of NO$_x$ is poor or more NO$_x$ may even be produced. Because this range of temperatures ("temperature window") for the NO$_x$ reduction process is narrow, successful application of the process is always critically dependent on locating the reducing agent injection system at the location at which the average temperature is optimum for the process.

In any application, however, the temperature will be nonhomogeneous, and process performance will be determined by an average over a temperature range. Since this always includes some temperatures which are too high and some which are too low for good NO$_x$ reduction, the practical extent of NO$_x$ control which the process can provide is always significantly less than is achieved in laboratory experiments.

Figure 1:
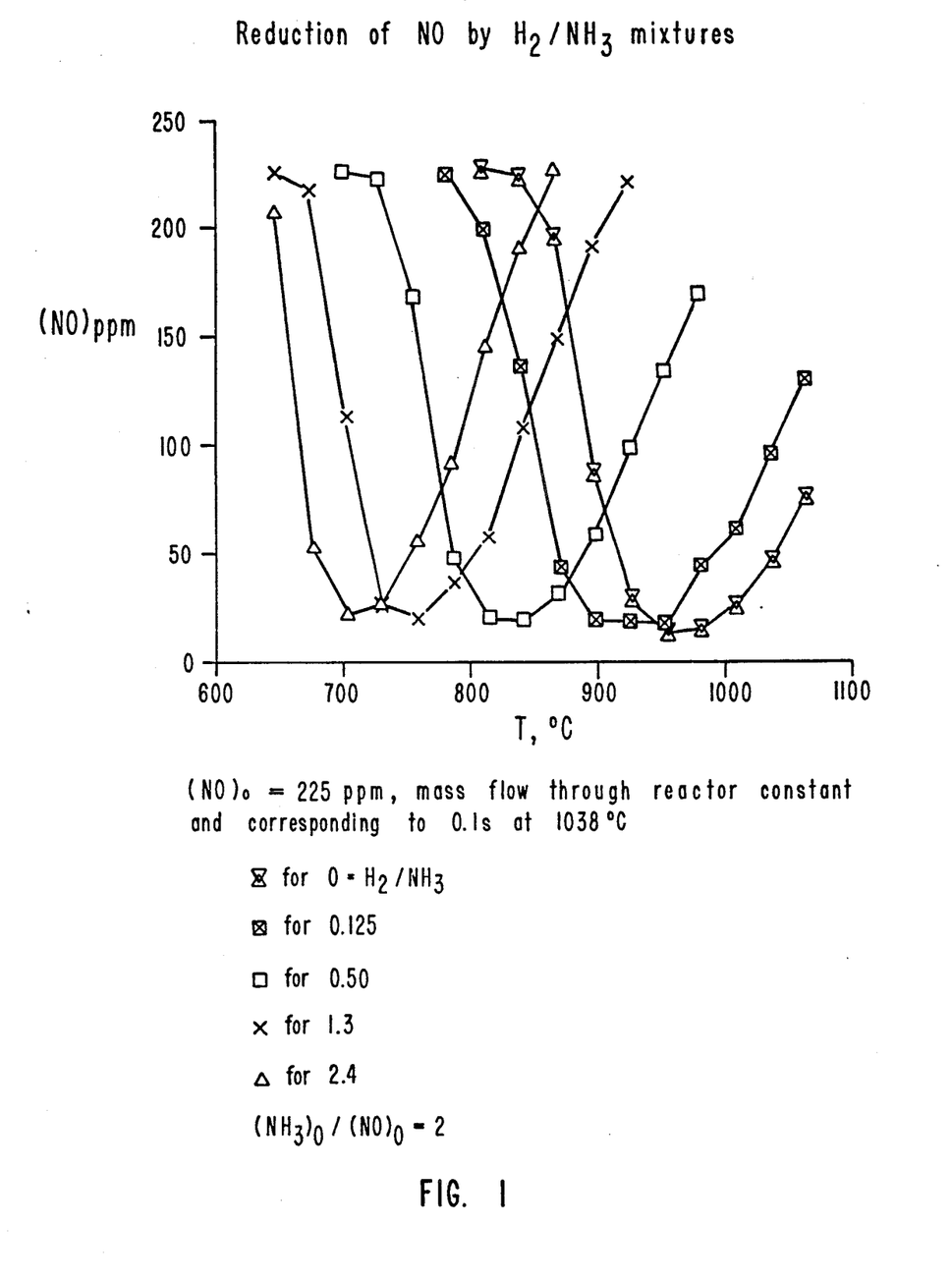
FIG. 1 is a graph illustrating how hydrogen mixed with ammonia shifts the temperature window of the selective noncatalytic $NO_x$ reduction process to lower temperatures.

Since the range of the NO$_x$ reduction temperature window increases with increasing reaction time, the longer reaction time available in incinerators compensates, in part, for this difficulty However, there is an additional problem: the optimum temperature for $NO_x$ reduction may be shifted. For example, as shown in FIG. 1, (quoted from R. K. Lyon and J. E. Hardy, "Discovery and Development of the Thermal DeNO$_x$ Process," 25 *Ind, Eng. Chem. Fundam.* 19 (1986); see also 21 *Environmental Science and Technology,* 232, (1987)) hydrogen ($H_2$) mixed with the ammonia shifts the $NO_x$ reduction temperature window to lower temperatures. The magnitude of the temperature shift increases as the amount of $H_2$ is increased.

This shifting of the temperature window is a general effect which occurs with other combustible materials, including CO, natural gas, etc. Even though the temperature not enlarged to a significant degree by the presence of other reducing agents in the combustion effluent stream.

Whereas some reducing agents of $NO_x$ emissions, which enlarge the useful temperature window for $NO_x$ reduction, are known in the art, certain problems may result in their use. Specifically, reference is made to the reducing agents disclosed in the two pending patent applications: (1) Methods for Reducing $NO_x$ Emissions From Combustion Effluents, U.S. Ser. No. 07/611,919, filed Nov. 9, 1990, in the name of Richard K. Lyon now U.S. Pat. No. 5,118,481; and (2) "Methods for Enlarging the Useful Temperature Window for $NO_x$ Reduction in Combustion Systems," U.S. Ser. No. 07/681,697, filed Apr. 5, 1991, in the name of Shih L. Chen now U.S. Pat. No. 5,116,584, which are both incorporated herein by specific reference. While certain of the agents disclosed in this art reduce $NO_x$ emissions, the formation of $N_2O$ emissions is also experienced as discussed previously. Thus, benefits incurred by some agents which can reduce $NO_x$ emissions is negatively countered if those agents act to replace the $NO_x$ emissions with an alternate pollutant such as $N_2O$ emissions.

The poor performance of $N_2O$ and $NO_x$ reduction processes also encounters a severe disadvantage due to the amount of sulfur contained in the fuel to be incinerated. In most instances, it is quite expensive and technically difficult to remove the sulfur before burning the fuel. It has been a common practice, therefore, to burn fuel which still contains a portion of the native sulfur. Sulfur compounds, including $SO_2$ and $SO_3$, are then produced during combustion and must be removed from the effluent gas stream by separate expensive technologies.

Combustion of a sulfur-containing fuel in a boiler, furnace, or other burner typically produces combustion effluents in which 98% to 99% of the sulfur exist in the form of $SO_2$, and only 1% to 2% of the sulfur exists in the form of $SO_3$. In processes where NO is reduced by injecting ammonia into the gas stream, some of the ammonia or ammonia precursors injected into the process will be left unreacted. Under certain conditions, $NH_3$ will react with the sulfur gases, i.e., as the combustion effluents cool, the remaining $NH_3$ will react with $SO_3$ and water vapor present in the effluent stream to form $NH_4HSO_4$ according to reaction equation (1);

$$NH_3 + SO_3 + H_2O \rightarrow NH_4HSO_4$$

Unfortunately, $NH_4HSO_4$ is an extremely sticky and corrosive liquid and is known to damage the equipment used in combustion processes.

The temperature at which the formation of $NH_4HSO_4$ occurs is such that, in a typical boiler or furnace of the type generally encountered in combustion processes, formation of $HN_4HSO_4$ occurs within the air heater. Thus, fouling, corrosion, and plugging of the air heater has been commonly encountered. As a result, the nitric oxide reduction technologies which use ammonia and ammonia precursors have had severe limitations and their commercial acceptance has been correspondingly limited. The operators of boilers and furnaces are often extremely reluctant to accept any technology which can cause fouling, plugging, and corrosion such as that expected from $NH_4HSO_4$.

It will be noted that in the event that there are no sulfur oxides in the effluent stream, the formation of $NH_4HSO_4$ is not a problem. In many combustion applications, however, there will be at least a small quantity of sulfur oxides in the effluent stream and, thus, some $SO_3$. The ammonia or ammonia precursors which are used in the nitric oxide reduction reactions can then react with the $SO_3$ present to form $NH_4HSO_4$, which even in small quantities can cause severe problems over time. Moreover, any $SO_x$ emissions which do not form $NH_4HSO_4$, may react with water to form a mist of sulfuric acid. This can also cause severe problems over time.

From the foregoing, it is apparent that what is currently needed in the art are methods for controlling $N_2O$ emissions from stationary combustion systems having variable flue gas temperatures.

It would also be an improvement in the art if the present invention could provide methods for controlling $N_2O$ emissions from stationary combustion systems while enlarging the useful temperature window and enhancing $NO_x$ reduction.

It would be a further advancement in the art to provide methods for controlling $N_2O$ emissions from stationary combustion systems which allows one to treat flue gas with ammonia or ammonia precursors to reduce $NO_x$ emissions without producing an alternate class of pollutants such as $N_2O$.

It would be a still further advancement in the art to provide methods for controlling $N_2O$ emissions from stationary combustion systems while enhancing $SO_x$ reduction.

It would be a still further advancement in the art to provide methods for controlling $N_2O$ emissions from stationary combustion systems while enlarging the useful temperature window for $NO_x$ and $SO_x$ reduction.

It would be an additional advancement in the art to provide methods for controlling $N_2O$ emissions from stationary combustion systems which are economically feasible.

It would also be an additional advancement in the art to provide methods for controlling $N_2O$ emissions from stationary combustion systems which perform effectively.

Such methods for controlling $NO_x$ emissions from stationary combustion systems are disclosed and claimed herein.

BRIEF SUMMARY AND OBJECTS OF THE INVENTION

The present invention relates to methods for controlling $N_2O$ emissions from stationary combustion systems. The present invention provides a process for controlling $N_2O$ in emissions in effluent streams by introducing an $N_2O$ controlling agent into the effluent stream within a certain temperature window. Preferably, the $N_2O$ control agent is an alkaline compound.

This process significantly eliminates $N_2O$ emissions from the combustion of the fuel.

Moreover, the present invention relates to methods for controlling $N_2O$ emissions while reducing $NO_x$ emissions from stationary combustion systems having variable flue gas temperatures. The present invention provides a process for controlling $N_2O$ emissions while reducing $NO_x$ emissions in effluent streams by introducing an $NO_x$ reducing agent and an $N_2O$ control agent into the effluent stream within a certain temperature window. Preferably, the $NO_x$ reducing agent is ammonia or an ammonia precursor. The $N_2O$ control agent is an alkaline compound, as defined at a later point. This process substantially reduces or eliminates the adverse effects of variable flue gas temperatures so as to reduce $NO_x$ emissions while significantly eliminating $N_2O$ emissions. The elimination of $N_2O$ emissions is necessary because the injection of urea or ammonium/urea to effluents in stationary combustion systems to control $NO_x$ emissions results in the production of higher $N_2O$ emissions.

The present invention also provides a process for reducing $SO_x$ emissions (which may or may not be present in effluent streams containing $NO_x$ emissions) by introducing an reducing agent, and an $N_2O$ control agent into the effluent stream within a certain temperature window. Preferably, the $SO_x$ reducing agent is an alkaline earth-metal compound. The $N_2O$ control agent is an alkaline compound. This process substantially reduces or eliminates the adverse effects of variable flue gas temperatures so as to reduce $SO_x$ emissions while significantly eliminating $N_2O$ emissions.

The present invention is further applicable to controlling $N_2O$ emissions while reducing $NO_x$ and $SO_x$ emissions in effluent streams by introducing an $NO_x$ and $SO_x$ reducing agent, and an $N_2O$ control agent into the effluent stream within a certain temperature window. Preferably, the $NO_x$ reducing agent is ammonia or an ammonia precursor. The $SO_x$ reducing agent is an alkaline-earth metal compound. The $N_2O$ control agent is an alkaline compound, as described below. This process substantially reduces or eliminates the adverse effects of variable flue gas temperatures so as to reduce $NO_x$ and $SO_x$ emissions while significantly eliminating $N_2O$ emissions.

It is, therefore, an object of the present invention to provide methods for controlling $N_2O$ emissions from stationary combustion systems having variable flue gas temperatures.

Another object of the present invention is to provide methods for controlling $N_2O$ emissions from stationary combustion systems while enlarging the useful temperature window and enhancing $NO_x$ reduction.

A further object of the present invention is to provide methods for controlling $N_2O$ emissions from stationary combustion systems which allows one to treat flue gas with ammonia or ammonia precursors to reduce $NO_x$ emissions without producing an alternate class of pollutants such as $N_2O$.

A still further object of the present invention is to provide methods for controlling $N_2O$ emissions from stationary combustion systems while enhancing $SO_x$ reductions.

A still further object of the present invention is to provide methods for controlling $N_2O$ emission from stationary combustion systems while enlarging the useful temperature window for $NO_x$ and $SO_x$ reduction.

An additional object of the present invention is to provide methods for controlling $N_2O$ emissions from stationary combustion systems which are economically feasible.

Another object of the present invention is to provide methods for controlling $N_2O$ emissions from stationary combustion systems which perform effectively.

BRIEF DESCRIPTION OF THE DRAWINGS

In order to better understand the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENT

The present invention relates to methods for controlling $N_2O$ emissions from stationary combustion systems such as power plant boilers, process furnaces, and incinerators. Additionally, the present invention relates to methods for controlling $N_2O$ emissions while reducing $NO_x$ emissions from stationary combustion systems which have variable flue gas temperatures, the $N_2O$ emissions being produced by the treatment of $NO_x$ with ammonia or ammonia precursors. Moreover, the present invention relates to methods for controlling $N_2O$ emissions while reducing $SO_x$ emissions from stationary combustion systems. The present invention also relates to methods for controlling $N_2O$ emissions while reducing $NO_x$ and $SO_x$ emissions from stationary combustion systems.

Specifically, the present invention is directed to a process for controlling $N_2O$ in effluent streams having temperature variations and containing $N_2O$ and excess oxygen. The process comprises the step of introducing an $N_2O$ control agent into the effluent stream at a point where the temperature of the effluent stream is in the range from about 1300° F. to about 3000° F. Preferably, the process comprises the step of introducing an $N_2O$ control agent into the effluent stream at a point where the temperature of the effluent stream is in the range from about 1800° F. to about 2800° F.

The $N_2O$ control agent of the process is an alkaline compound. The term "alkaline compounds" as used in this specification is meant to refer to compounds which comprise any of the univalent, mostly basic metals of Groups I and II of the periodic table. These basic metals comprise lithium, sodium, potassium, rubidium, cesium, francium, magnesium and calcium. The alkaline compounds generally comprise alkaline-metal compounds of an organic acid, alkali-metal hydroxides, alkali-metal carbonates, alkaline-earth metal compounds, and the like.

Some specific examples of alkaline compounds which fall within the scope of the present invention include sodium-based compounds (NaOH, $Na_2SO_2$, $NaHSO_4$, and $Na_2CO_3$), $Mg(CH_3COO)_2$ or $Ca(CH_3COO)_2$. Another example is monosodium glutamate which is the monosodium salt of the naturally occurring L-form of glutamic acid. The compound is manufactured by the fermentation of carbohydrate sources. Monosodium glutamate is very soluble in water, and sparing soluble in alcohol. It must be remembered, however, that the present invention is not limited to these specific examples, and that any compound fitting within and/or exhibiting the properties of alkaline compounds as broadly defined may also be included.

In one embodiment of the present invention, the $N_2O$ control agent is an alkali-metal compound of an organic acid. Preferably, the $N_2O$ control agent is an alkali-metal compound of an organic acid such as sodium glutamate, potassium glutamate, sodium formate, potassium formate, sodium acetate, and potassium acetate. Nevertheless, it should be understood that, while the foregoing may be preferred under certain conditions, the present invention is not limited to the foregoing group of compounds.

In another embodiment of the present invention, the $N_2O$ control agent is an alkali-metal hydroxide. Preferably, the $N_2O$ control agent is an alkali-metal hydroxide selected from the group consisting essentially of LiOH, NaOH, and KOH. Nevertheless, it should be understood that the present invention is not limited to the foregoing group of compounds.

In still another embodiment of the present invention, the $N_2O$ control agent is an alkali-metal carbonate. Preferably, the $N_2O$ control agent is an alkali-metal carbonate selected from the group consisting essentially of lithium carbonate, lithium bicarbonate, sodium carbonate, sodium bicarbonate, potassium carbonate, and potassium bicarbonate. Nevertheless, it should be understood that the present invention is not limited to the foregoing group of compounds.

In yet another embodiment of the present invention, the $N_2O$ control agent is an alkaline-earth metal compound. Preferably, the $N_2O$ control agent is an alkaline-earth metal compound selected from the group consisting essentially of CaO, $CaCO_3$, $Ca(OH)_2$, $Ca(COOH)_2$, $Ca(CH_3COO)_2$, MgO, $MgCO_3$, $Mg(OH)_2$, $Mg(COOH)_2$, and $Mg(CH_3COO)_2$. Nevertheless, it should be understood that the present invention is not limited to the foregoing group of compounds.

An examination of the equivalent mole fraction of the alkali and/or alkaline-earth metals in the $N_2O$ control agent can also be determined. Preferably, the equivalent mole fraction of the alkali and/or alkaline-earth metals in the $N_2O$ control agent is in the range from about 5 to about 2000 ppm by volume, in the effluent stream. Most preferably, the $N_2O$ control agent is in the range from about 50 ppm to about 200 ppm by volume, in the effluent stream.

The amount of $N_2O$ emissions that can be expected following the use of the $N_2O$ control agent are in the range from about 0 ppm to about 50 ppm. Preferably, the limited $N_2O$ emissions which do occur in the range from about 0 ppm to about 10 ppm.

As previously indicated, the present invention can be successfully used to significantly suppress the formation of $N_2O$ in flue gases having a temperature in the range from about 1300° F. to about 2800° F. at the point of contacting. With regard to the $N_2O$ control agent, the reaction time is preferably greater than 0.1 seconds and more preferably greater than 0.2 seconds. The temperature decay versus time in the reaction zone of the present invention is preferably less than about 600° F./second, and most preferably less than about 200° F./second.

It should also be mentioned that the oxygen concentration in the $N_2O$ containing effluent streams shall be in the range from about 0.1% to about 15% by volume of oxygen to total flue gas. Preferably, the oxygen concentration in the effluent streams is in the range from about 2% to about 9%. It should be noted that the term "controlling agent," as used throughout this application, is meant to illustrate that there are limited amounts, if any, of $N_2O$ emissions. Controlling can mean that the $N_2O$ control agent suppresses the formation of $N_2O$ emissions. Controlling can also mean that the $N_2O$ control agent significantly eliminates $N_2O$ emissions.

The present invention is also directed to a process for controlling $N_2O$ emissions while reducing $NO_x$ in effluent streams having temperature variations and containing $NO_x$ and excess oxygen. The process comprising the step of introducing an $NO_x$ reducing agent into an effluent stream at a point where the temperature of the effluent stream is in the range from about 1300° F. to about 2000° F., preferably in the range from about 1600° F. to about 1900° F.

The process also comprises the step of introducing an $N_2O$ control agent into the effluent stream at a point where the temperature of the effluent stream is in the range from about 1300° F to about 3000° F., preferably in the range from about 1800° F. to about 2800° F. The $N_2O$ control agent of this process is similar to the $N_2O$ control agent employed in the process for controlling $N_2O$ emissions.

The $NO_x$ reducing agent of the process is ammonia and/or an ammonia precursor, such as urea, ammonium sulfate, ammonium carbonate, ammonium bicarbonate, ammonium formate, ammonium acetate, and ammonium oxalate. Nevertheless, it should be understood, however, that the $NO_x$ reducing agent is not limited to the foregoing group of compounds, but would include other compounds capable of reducing $NO_x$ emissions.

Preferably, it has been found that by using a combination of urea and alkaline compounds, over a range of ratios, effective $NO_x$ reduction can be obtained over a significantly wider temperature range than by using conventional noncatalytic $NO_x$ reduction processes with ammonia, urea, or a combination of ammonia and urea. In this way, the adverse effects of variable flue gas temperatures can be substantially reduced or eliminated and the increased reduction of $NO_x$ emissions can occur while the control over the $N_2O$ emissions is maintained.

Within the instant invention, the $NO_x$ reducing agent and the $N_2O$ control agent may be injected into the flue gas as a mist in a single step. Preferably, urea and alkaline compound are injected into the flue gas in a single step. The introduction of the compounds in a single step can be differentiated from a step-wise or multi-stage process wherein a plurality of treatment fluids are injected into a combustion effluent stream at a plurality of temperature zones. It can be understood that, not only does the single stage use of urea and alkaline compound provide for effective $NO_x$ and $SO_x$ reductions over a significantly wider temperature range, but also that a single stage step is less complicated and less expensive.

Preparation of the solution containing urea and an alkaline compound is accomplished in many different ways. In one embodiment of the process for reducing $NO_x$, the $N_2O$ control agent and the $NO_x$ reducing agent are mixed together and injected at the same location. Preferably, the urea and an alkaline compound are premixed in a predetermined ratio as a solution and injected in a single stage into the flue gas. Alternatively, solutions containing the urea and an alkaline compound, are impingently mixed in a single stage into the flue gas.

Preferably, urea and alkaline compounds are typically purchased in a solid form. Their use as a solution above, therefore, requires that the solids be dissolved in some type of a solvent. Examples of solvents include water and alcohol; however, it should be understood that other solvents, known to those skilled in the art, exist which will dissolve urea and/or an alkaline compound.

In the preferred embodiment of the present invention, an aqueous solution of urea is prepared, the concentration of urea being in the range from about 2% to about 30%. Thereafter, the aqueous urea and alkaline compound solution is injected as a mist into the combustion effluent stream.

Alternatively, in another embodiment, the $N_2O$ control agent and the $NO_x$ reducing agent are injected at separate locations. The concentration of the urea solution is in the range from about 2% to about 30%. The concentration of the alkaline compound is in the range from about 0.25% to about 7%.

The presence of an $NO_x$ reducing agent in the flue gas is in a predetermined stoichiometric ratio. The amount of $NO_x$ reducing agent, or specifically the urea, in the effluent stream can also be determined by examining the molar ratio of nitrogen in the $NO_x$ reducing agent to the $NO_x$ in the effluent stream. Preferably, the molar ratio of nitrogen in the $NO_x$ reducing agent to the $NO_x$ in the effluent stream is in the range from about 0.5:1 to about 5:1. Most preferably, the molar ratio of nitrogen in the $NO_x$ reducing agent to the $NO_x$ in the effluent stream is in the range from about 1:1 to about 3:1.

An examination of the equivalent mole fraction of the alkali and/or alkaline-earth metals in the $N_2O$ control agent can also be determined. Preferably, the equivalent mole fraction of the alkali and/or alkaline-earth metals in the $N_2O$ control agent is in the range from about 5 to about 2000 ppm by volume, in the effluent stream. Most preferably, the $N_2O$ control agent is in the range from about 50 to about 200 ppm by volume, in the effluent stream.

It has also been found that the injection of an $NO_x$ reducing agent and an $N_2O$ control agent into a flue gas provides for the significant elimination of $N_2O$ emissions in the flue gas. This is contrary to the injection of pure urea or other urea combinations into flue gas which actually produces high $N_2O$ emissions.

The amount of $N_2O$ emissions that can be expected following the use of urea and an alkaline compound when compared to $N_2O$ emission formed in the presence of urea alone are in the range from about 0 ppm to about 20 ppm. Preferably, the limited $N_2O$ emissions which do occur in the range from about 0 ppm to about 5 ppm.

As discussed above, it can be appreciated that the term "controlling agent," as used throughout this application, is meant to illustrate that there are limited amounts, if any, of $N_2O$ emissions. Controlling can mean that the $N_2O$ control agent suppresses the formation of $N_2O$ emissions. Controlling can also mean that the $N_2O$ control agent significantly eliminates $N_2O$ emissions.

As previously indicated, the present invention can be successfully used to reduce $NO_x$ in flue gases having a temperature in the range from about 1300° F. to about 2000° F. at the point of contacting. With regard to the introduction of the $N_2O$ control agent and the $NO_x$ reducing agent, the reaction time is preferably greater than 0.1 seconds and more preferably greater than 0.2 seconds. The temperature decay versus time in the reaction zone of the present invention is preferably less than about 600° F./second, and most preferably less than about 200° F./second.

The present invention can also be successfully used to significantly suppress the formation of $N_2O$ in flue gases having a temperature in the range from about 1300° F. to about 2800° F. at the point of contacting. With regard to the $N_2O$ control agent and the $NO_x$ reducing agent, the reaction time is preferably greater than 0.1 seconds and more preferably greater than 0.2 seconds. The temperature decay versus time in the reaction zone of the present invention is preferably less than about 600° F./second, and most preferably less than about 200° F./second.

It should also be mentioned that the oxygen concentration in the $N_2O$ and $NO_x$ containing effluent streams shall be in the range from about 0.1% to about 15% by volume of oxygen to total flue gas. Preferably, the oxygen concentration in the effluent streams is in the range from about 2% to about 9%.

The present invention is further applicable to controlling $N_2O$ emissions while reducing $SO_x$ emissions in effluent streams having temperature variations and containing $SO_x$ and excess oxygen. It should be understood that in some instances, $N_2O$ emissions occur in conjunction with $SO_x$ emissions and not in the presence of $NO_x$ emissions.

The process comprises the step of introducing an $SO_x$ reducing agent into an effluent stream at a point where the temperature of the effluent stream is in the range from about 800° F. to about 3000° F., preferably, in the range from about 1800° F. to about 2800° F. The process further comprises the step of introducing an $N_2O$ control agent into the effluent stream at a point where the temperature of the effluent stream is in the range from about 1300° F. to about 3000° F., preferably, in the range from about 1800° F. to about 2800° F.

The $SO_x$ reducing agent of the process is an alkaline-earth metal compound. Preferably, the $SO_x$ reducing agent is an alkaline-earth metal compound selected from the group consisting essentially of $CaO$, $CaCO_3$, $Ca(OH)_2$, $Ca(COOH)_2$, $Ca(CH_3COO)_2$, $MgO$, $MgCO_3$, $Mg(OH)_2$, $Mg(COOH)_2$, and $Mg(CH_3COO)_2$. Nevertheless, it should be understood that the present invention is not limited to this specific group of compounds.

Generally, the steps taken with regard to the $SO_x$ reducing process are similar to the $NO_x$ reducing process. Specifically, the $N_2O$ control agent and the $SO_x$ reducing agent are mixed together and injected at the same location or the $N_2O$ control agent and the $SO_x$ reducing agent are injected at separate locations. Also, the molar ratio of the alkaline-earth metal in the $SO_x$ reducing agent to the $SO_x$ in the effluent stream is in the range from about 0.5:1 to about 5:1. Additionally, the equivalent mole fraction of the alkali metal in $N_2O$ control agent is in the range from about 10 to about 2000 ppm, by volume, in the effluent stream. Further, the oxygen concentration in said effluent streams is in the range from about 0.1% to about 15%, preferably, in the range from about 2% to about 9%.

The present invention is also directed to a process for controlling $N_2O$ emissions while reducing $NO_x$ and $SO_x$ in effluent streams having temperature variations and containing $NO_x$, $SO_x$, and excess oxygen. The control of pollutants in effluent streams naturally requires that in some instances one would want to control the presence of each of these three types of pollutants.

As discussed above, existing selective noncatalytic $NO_x$ reduction processes control $NO_x$ emissions from stationary combustion systems by injecting nitrogen-containing reducing agents such as ammonia or ammonia precursors (e.g., urea) either alone or in combination with a second reducing agent, into the flue gases. The nitrogen-containing reducing agent causes a homogeneous gas phase reaction to occur which reduces $NO_x$ to molecular nitrogen and water. Unfortunately, selective noncatalytic $NO_x$ reduction processes that employ ammonia or urea are ineffective since they lead to the unfavorable production of $N_2O$ emissions. Moreover, as discussed above, the use of reducing agents such as ammonia or urea to treat flue gases can lead to the undesirable formation of $NH_4HSO_4$ production due to the presence of $SO_x$ emissions. Thus, there may be instances where one must control the presence of $N_2O$, $NO_x$, and $SO_x$ emissions.

The process comprises the step of introducing an $NO_x$ reducing agent into an effluent stream at a point where the temperature of the effluent stream is in the range from about 1300° F. to about 2000° F., preferably, in the range from about 1600° F. to about 1900° F. The process also comprises the step of introducing an $SO_x$ reducing agent into an effluent stream at a point where the temperature of the effluent stream is in the range from about 800° F. to about 3000° F., preferably, in the range from about 1800° F. to about 2800° F. The process further comprises the step of introducing an $N_2O$ control agent into the effluent stream at a point where the temperature of 3000° F., preferably, in the range from about 1800° F to about 2800° F.

Generally, the steps taken with regard to the $NO_x$ and $SO_x$ reducing process is similar to the $NO_x$ and the $SO_x$ reducing processes discussed above. Specifically, the $NO_x$ reducing agent, $SO_x$ reducing agent, and $N_2O$ control agent of this process is similar to the $N_2O$ control agent employed in the processes for reducing $NO_x$ and $SO_x$ emissions. In addition, the molar ratio of nitrogen in the $NO_x$ reducing agent to the $NO_x$ in the effluent stream is in the range from about 0.5:1 to about 5:1; the molar ratio of the alkaline-earth metal in the $SO_x$ reducing agent to the $SO_x$ in the effluent stream is in the range from about 0.5:1 to about 5:1; the equivalent mole fraction of the alkali metal in $N_2O$ control agent is in the range from about 5 to about 2000 ppm, by volume, in the effluent stream; and the oxygen concentration in said effluent streams is in the range from about 0.1% to about 15%.

One distinction which must be made is in regard to the introduction of the different agents in this process. In one embodiment, the $NO_x$ reducing agent, the $N_2O$ control agent, and the $SO_x$ reducing agent are mixed together and injected at the same location. In another embodiment, the $NO_x$ reducing agent, the $N_2O$ control agent, and the $SO_x$ reducing agent are injected at different locations. In still another embodiment, the $NO_x$ reducing agent and the $N_2O$ control agent are injected at the same location but separate from the injection location of the $SO_x$ reducing agent. In a further embodiment, the $SO_x$ reducing agent and the $N_2O$ control agent are injected at the same location but separate from the injection location of the $NO_x$ reducing agent. In a still further embodiment, the $SO_x$ reducing agent and the $NO_x$ reducing agent are injected at the same location but separate from the injection location of the $N_2O$ control agent.

Experiments were conducted to determine the performance of the $N_2O$ control agent in eliminating $N_2O$ emissions. Experiments were also conducted to determine the performance of the $N_2O$ control agent in eliminating $N_2O$ emissions while reducing $NO_x$ emissions. Experiments were also conducted to determine the performance of the $N_2O$ control agent in eliminating $N_2O$ emissions while reducing $SO_x$ emissions.

The following examples illustrate the suppression of the formation of $N_2O$ emissions achieved by the present invention. The following examples further illustrate the improved $NO_x$ reduction achieved by the present invention over a wide temperature range in addition to eliminating $N_2O$ emissions. The following examples further illustrate the improved $SO_x$ reduction achieved by the present invention over a wide temperature range in addition to eliminating $N_2O$ emissions. These examples are intended to be purely exemplary of the use of the invention and should not be viewed as limiting the scope of the present invention.

EXAMPLE 1

Figure 2:
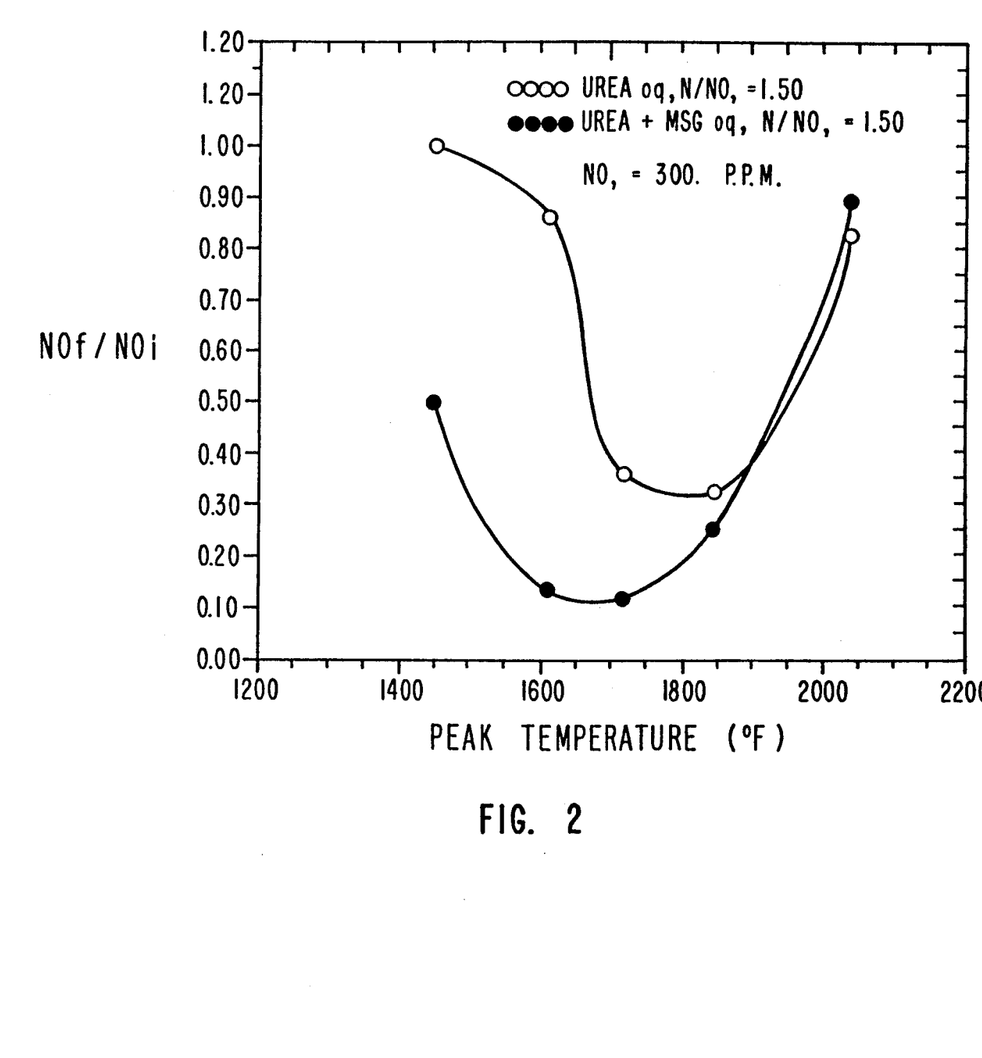
FIG. 2 is a graph comparing $NO_x$ reduction efficiency of urea and urea plus an amount of monosodium glutamate.

In this example, the $NO_x$ reduction efficiency ($NO_f/NO_i$) of urea/monosodium glutamate and urea were compared over a given temperature range. A $1 \times 10^6$ BTU/hour furnace fired with natural gas at 3.5% excess oxygen was used to conduct the experiment. The initial $NO_x$ concentration ("$NO_i$") in the combustion effluents ranged from about 297 to about 303 ppm. The molar ratio of nitrogen in reducing agent to $NO_i$ was 1.5. The temperature decay versus time in the reaction zone was approximately 400° F./second. The experimental results are reproduced in Table 1 and shown graphically in FIG. 2.

TABLE 1

| Chemical | $NO_i$ (ppm) | $N/NO_i$ | Peak Temp. (°F.) | $NO_f/NO_i$ |
|---|---|---|---|---|
| Urea | 298 | 1.50 | 1454 | 1.0 |
| Urea | 299 | 1.50 | 1614 | 0.86 |
| Urea | 303 | 1.50 | 1720 | 0.36 |
| Urea | 297 | 1.50 | 1847 | 0.32 |
| Urea | 298 | 1.50 | 2040 | 0.83 |
| Urea + MSG | 298 | 1.50 | 1454 | 0.5 |
| Urea + MSG | 299 | 1.50 | 1614 | 0.13 |
| Urea + MSG | 303 | 1.50 | 1720 | 0.12 |
| Urea + MSG | 297 | 1.50 | 1847 | 0.25 |
| Urea + MSG | 298 | 1.50 | 2040 | 0.89 |

Although the above $NO_x$ reduction efficiency with urea was efficiency with urea/monosodium glutamate the temperature window for $NO_x$ reduction was much wider with urea/monosodium glutamate. The addition of monosodium glutamate significantly extended the reaction window to lower temperatures and enhanced the $NO_x$ reduction efficiencies with urea. Close to 90%

$NO_x$ reduction was achieved at 1700° F. with the addition of monosodium glutamate to urea.

EXAMPLE 2

Figure 3:
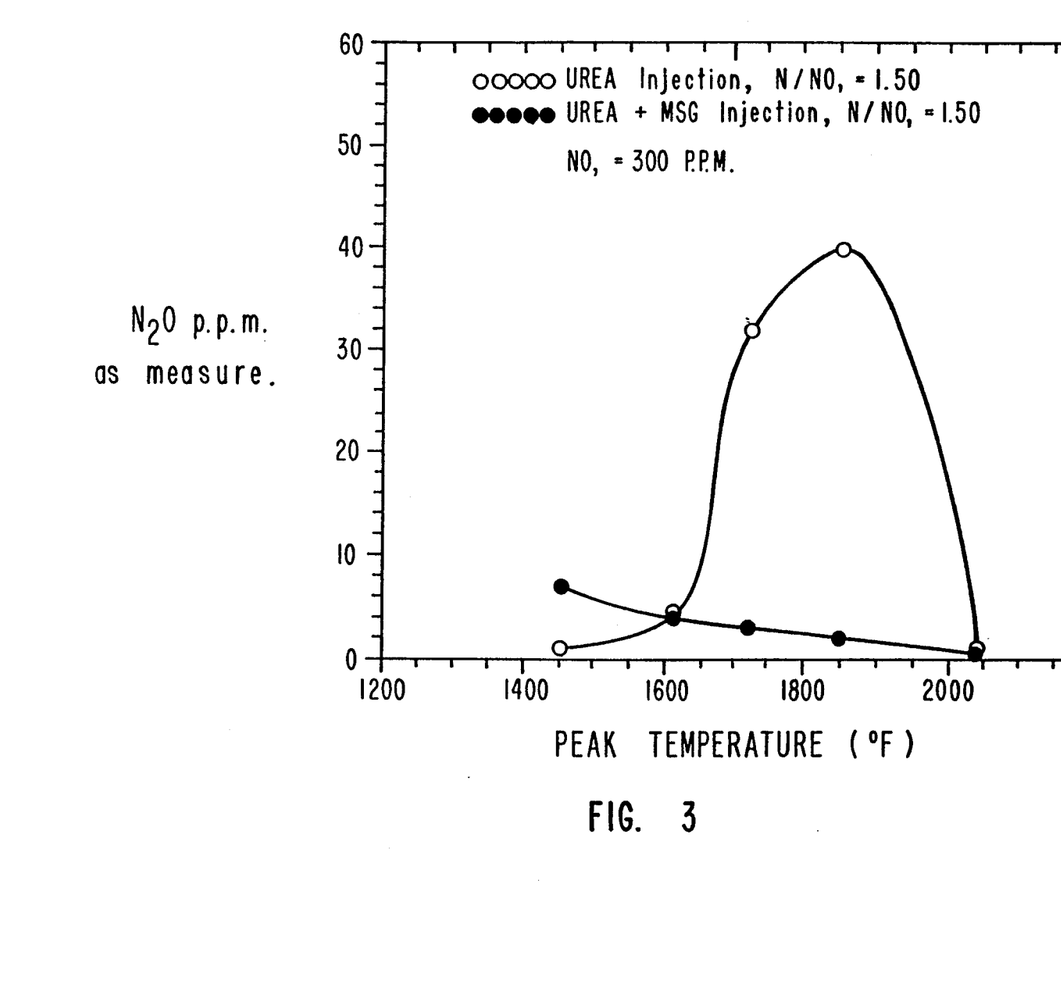
FIG. 3 is a graph comparing $N_2O$ emissions of urea and urea plus an amount of monosodium glutamate.

In this example, the $N_2O$ reduction efficiency of urea/monosodium glutamate and urea were compared over a given temperature range. A 1 x 10^6 BTU/hour furnace fired with natural gas at 3.5% excess oxygen was used to conduct the experiment. The initial $NO_x$ concentration ($NO_i$) in the combustion effluents ranged from about 297 to about 303 ppm. The molar ratio of nitrogen in reducing agent to $NO_i$ was 1.5. The temperature decay versus time in the reaction zone was approximately 400° F./second. The experimental results are reproduced in Table 2 and shown graphically in FIG. 3.

TABLE 2

| Chemical | $NO_i$ (ppm) | $N/NO_i$ | Peak Temp. (°F.) | $N_2O$ (ppm) |
|---|---|---|---|---|
| Urea | 298 | 1.50 | 1454 | 1 |
| Urea | 299 | 1.50 | 1614 | 4.5 |
| Urea | 303 | 1.50 | 1720 | 32 |
| Urea | 297 | 1.50 | 1847 | 40 |
| Urea | 298 | 1.50 | 2040 | 1 |
| Urea + MSG | 298 | 1.50 | 1454 | 7 |
| Urea + MSG | 299 | 1.50 | 1614 | 4 |
| Urea + MSG | 303 | 1.50 | 1720 | 3 |
| Urea + MSG | 297 | 1.50 | 1847 | 2 |
| Urea + MSG | 298 | 1.50 | 2040 | 0.5 |

The results of Example 2 confirm that the efficiency of $N_2O$ reduction with urea depends strongly on the injection temperature, with the optimum near 1800° F. Use of urea/monosodium glutamate significantly eliminated the formation of $N_2O$ emissions. Use of urea/monosodium glutamate also widens the temperature window for effective $N_2O$ reduction. Using a 4:1 molar ratio of urea:monosodium glutamate, it is possible to achieve $N_2O$ emissions in the range from about 0 ppm to about 8 ppm in a window between about 1450° F. to about 2050° F.

EXAMPLE 3

In this example, the $NO_x$ reduction efficiency ($NO_f/NO_i$) of urea/sodium-containing compounds other than monosodium glutamate and urea were compared over a given temperature range. A 1×10^6 BTU/hour furnace fired with natural gas at 3.5% excess oxygen was used to conduct the experiment. The initial $NO_x$ concentration ("$NO_i$") in the combustion effluents ranged from about 298 to about 301 ppm. The ratio of reducing agent to $NO_i$ was 1.5. The temperature decay versus time in the reaction zone was approximately 400° F./second. The experimental results are reproduced in Table 3.

TABLE 3

| Chemical | $NO_i$, ppm | $N/NO_i$ | Peak Temp., °F. | $NO_f/NO_i$ |
|---|---|---|---|---|
| Urea | 298 | 1.50 | 1454 | 1.0 |
| Urea | 299 | 1.50 | 1614 | 0.86 |
| Urea | 303 | 1.50 | 1720 | 0.36 |
| Urea | 297 | 1.50 | 1847 | 0.32 |
| Urea | 298 | 1.50 | 2040 | 0.83 |
| Urea + NaOH | 300 | 1.50 | 1850 | 0.27 |
| Urea + NaOH | 300 | 1.50 | 1740 | 0.23 |
| Urea + $Na_2CO_3$ | 300 | 1.50 | 1850 | 0.27 |
| Urea + $Na_2CO_3$ | 301 | 1.50 | 1840 | 0.23 |

Similar to Example 1, the temperature window for $NO_x$ reduction was much wider with urea/NaOH or $Na_2CO_3$ than with pure urea. The addition of these sodium-containing compounds significantly extended the reaction window to lower temperatures and enhanced the $NO_x$ reduction efficiencies with urea.

EXAMPLE 4

In this example, the $N_2O$ reduction efficiency of urea/sodium-containing compounds (other than monosodium glutamate) and urea were compared over a given temperature range. A 1×10^6 BTU/hour furnace fired with natural gas at 3.5% excess oxygen was used to conduct the experiment. The initial $NO_x$ concentration ($NO_i$) in the combustion effluents ranged from about 297 to about 303 ppm. The molar ratio of nitrogen in reducing agent to $NO_i$ was 1.5. The temperature decay versus time in the reaction zone was approximately 400° F./second. The experimental results are reproduced in Table 4.

TABLE 4

| Chemical | $NO_i$ (ppm) | $N/NO_i$ | Peak Temp. (°F.) | $N_2O$ (ppm) |
|---|---|---|---|---|
| Urea | 298 | 1.50 | 1454 | 1 |
| Urea | 299 | 1.50 | 1614 | 4.50 |
| Urea | 303 | 1.50 | 1720 | 32 |
| Urea | 297 | 1.50 | 1847 | 40 |
| Urea | 298 | 1.50 | 2040 | 1 |
| Urea + NaOH | 300 | 1.5 | 1850 | 0 |
| Urea + $Na_2CO_3$ | 301 | 1.5 | 1850 | 0 |

The results of Example 4 confirm that the use of simple sodium-containing compounds, such as NaOH and $Na_2CO_3$, significantly eliminate the formation of $N_2O$ emissions. Using a 9:1 molar ratio of urea:sodium-containing compounds, it is possible to eliminate $N_2O$ emissions with injections at 1850° F.

EXAMPLE 5

An experiment was conducted similar to Example 2 with the exception that a comparison is made between the $N_2O$ emission of uera/$Mg(CH_3COO)_2$ or $Ca(CH_3COO)_2$ and urea over a given temperature range. The experimental results are reproduced in Table 5.

TABLE 5

| Chemical | $NO_i$ (ppm) | $N/NO_i$ | Peak Temp. (°F.) | $N_2O$ (ppm) |
|---|---|---|---|---|
| Urea | 298 | 1.50 | 1454 | 1 |
| Urea | 299 | 1.50 | 1614 | 4.50 |
| Urea | 303 | 1.50 | 1720 | 32 |
| Urea | 297 | 1.50 | 1847 | 40 |
| Urea | 298 | 1.50 | 2040 | 1 |
| Urea + $Mg(CH_3COO)_2$ | 300 | 1.5 | 1850 | 16 |
| Urea + $Ca(CH_3COO)_2$ | 301 | 1.5 | 1850 | 12 |

Similar to Example 2, the results of Example 5 confirm that the use of urea/$Mg(CH_3COO)_2$ or $Ca(CH_3COO)_2$ significantly eliminated the formation of $N_2O$ emissions. The additions of 1200 ppm (by volume) of $Mg(CH_3COO)_2$ or $Ca(CH_3COO)_2$ to urea resulted in $N_2O$ reductions of about 60% and 70% respectively.

EXAMPLE 6

An experiment was conducted similar to Example 2 except that a comparison is made between the $N_2O$ emission of urea/$Mg(CH_3COO)_2$ and $Na_2CO_3$ and urea over a given temperature range. The experimental results are reproduced in Table 6.

TABLE 6

| Chemical | $NO_i$ (ppm) | $N/NO_i$ | Peak Temp. (°F.) | $N_2O$ (ppm) |
|---|---|---|---|---|
| Urea | 298 | 1.50 | 1454 | 1 |
| Urea | 299 | 1.50 | 1614 | 4.50 |
| Urea | 303 | 1.50 | 1720 | 32 |
| Urea | 297 | 1.50 | 1847 | 40 |
| Urea | 298 | 1.50 | 2040 | 1 |
| Urea + Mg + $Na_2CO_3$ | 300 | 1.5 | 1850 | 0 |

Similar to Example 2, the results of Example 6 confirm that the use of urea/$Mg(CH_3COO)_2$ and $Na_2CO_2$ significantly eliminated the formation of $N_2O$ emissions. The additions of about 20 ppm $Na_2CO_3$ to the mixture of urea and $Mg(CH_3COO)_2$ Completely eliminated $N_2O$ emissions.

EXAMPLE 7

An experiment was conducted similar to Example 2 to compare the $N_2O$ emission of urea/NaOH or $Na_2CO_3$ and urea over a given temperature range. This example is similar to Example 4 with the exception that different concentrations of NaOH or $Na_2CO_3$ were employed. The experimental results are reproduced in Table 7.

TABLE 7

|  | $NO_i$ ppm | $N/NO_i$ | Temp °F. | $N_2O$ ppm |
|---|---|---|---|---|
| Urea | 300 | 1.50 | 1740 | 40 |
| Urea + NaOH (5-ppmNa) | 300 | 1.50 | 1740 | 4 |
| Urea + NaOH (20-ppmNa) | 300 | 1.50 | 1740 | 1 |
| Urea + $Na_2CO_3$ (20-ppm Na) | 300 | 1.50 | 1740 | 0 |

EXAMPLE 9

Under the same furnace conditions as in Example 1, experiments were also conducted with the promoter injected separately from the urea. With the aqueous urea solution injected at 1850° F., an aqueous solution of $Na_2CO_3$, equivalent to 100 ppm sodium by volume, was injected at 2100, 1700, and 1550° F., separately from the urea. As shown in Table 8, all but the 1550° F. injection case suppressed the formation of $N_2O$ completely; 63% of $N_2O$ was removed with the injection of $Na_2CO_3$ at 1550° F.

TABLE 8

|  | $NO_i$ ppm | $N/NO_i$ | $Na_2CO_3$ Temp °F. | $N_2O$ ppm |
|---|---|---|---|---|
| Urea @ 1850° F. | 300 | 1.50 | NA | 49 |
| Urea @ 1850° F. | 300 | 1.50 | 2100 | 0 |
| Urea @ 1850° F. | 300 | 1.50 | 1700 | 0 |
| Urea @ 1850° F. | 300 | 1.50 | 1550 | 18 |

EXAMPLE 9

Similar to Example.8, experiments were also carried out to study the control of $N_2O$ emissions produced by sources other than urea, including combustion systems such as fluidized bed combustors or from other chemical processes. Under the same furnace conditions, $N_2O$ gas was introduced at 1800° F. to simulate the formation of $N_2O$ from fluidized bed combustors. Aqueous sodium carbonate solution was injected at 2150° F. for the removal of $N_2O$ emissions. It can be seen from FIG. 4 that the efficiency of $N_2O$ reduction with sodium carbonate depended upon the initial $N_2O$ concentration and the Na to $N_2O$ molar ratio. Fifty percent reduction could be achieved at a sodium to $N_2O$ ratio of 0.1.

Figure 4:
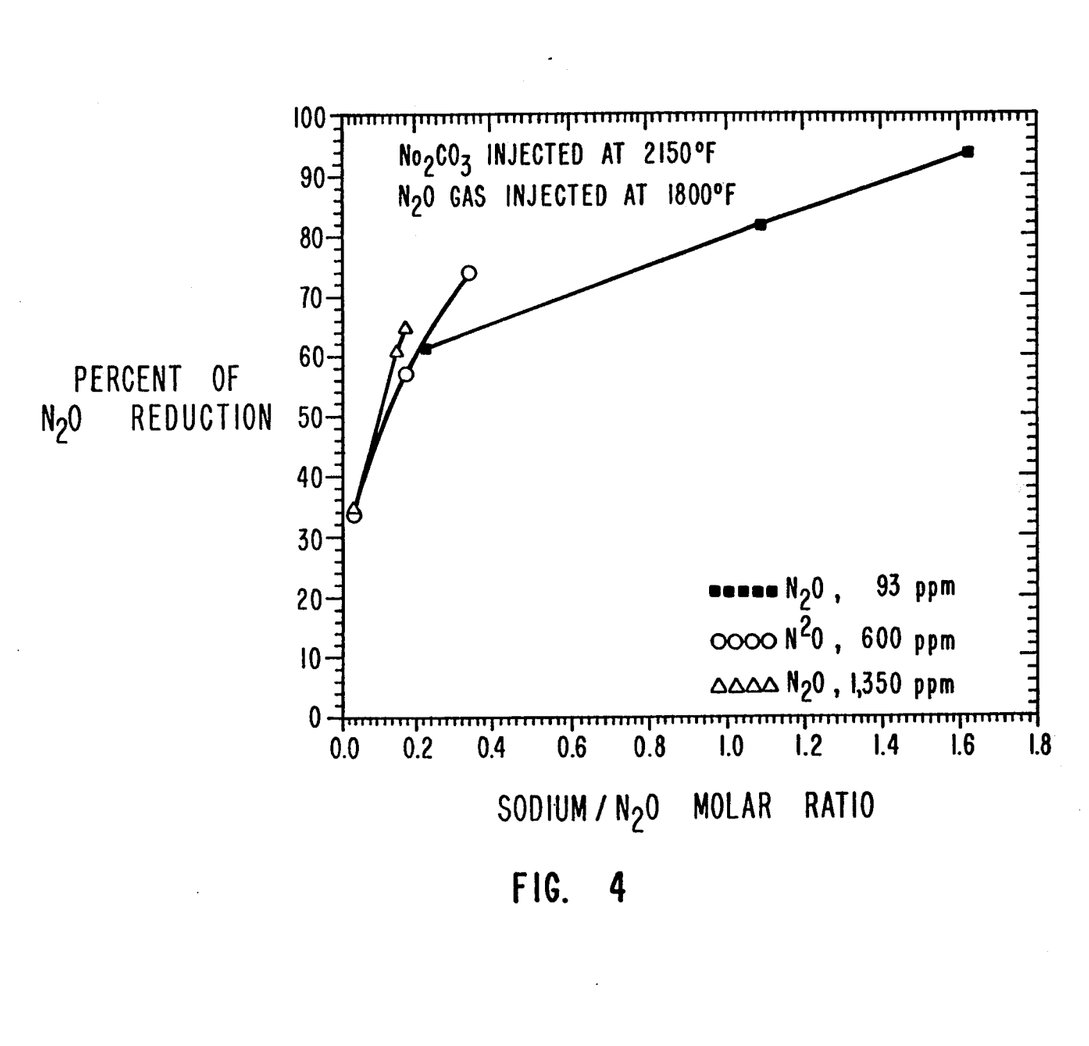
FIG. 4 is a graph illustrating $N_2O$ reduction efficiency of aqueous $Na_2CO_3$.

The data presented in FIG. 4 is also documented in Table 9

TABLE 9

| SODIUM injected at 2150.° F. $N_2O$ injected at 1800.° F. | | |
|---|---|---|
| $N_2O$ (PPM) | SODIUM/$N_2O$ Molar Ratio | $N_2O$ REDUCTION (%) |
| 93 | 0.21 | 61.4 |
| 93 | 1.07 | 82.1 |
| 93 | 1.61 | 94.0 |
| 600 | 0.03 | 33.8 |
| 600 | 0.16 | 57.1 |
| 600 | 0.33 | 74.0 |
| 1350 | 0.03 | 35.0 |
| 1350 | 0.14 | 61.0 |
| 1350 | 0.16 | 65.0 |

EXAMPLE 10

Figure 5:
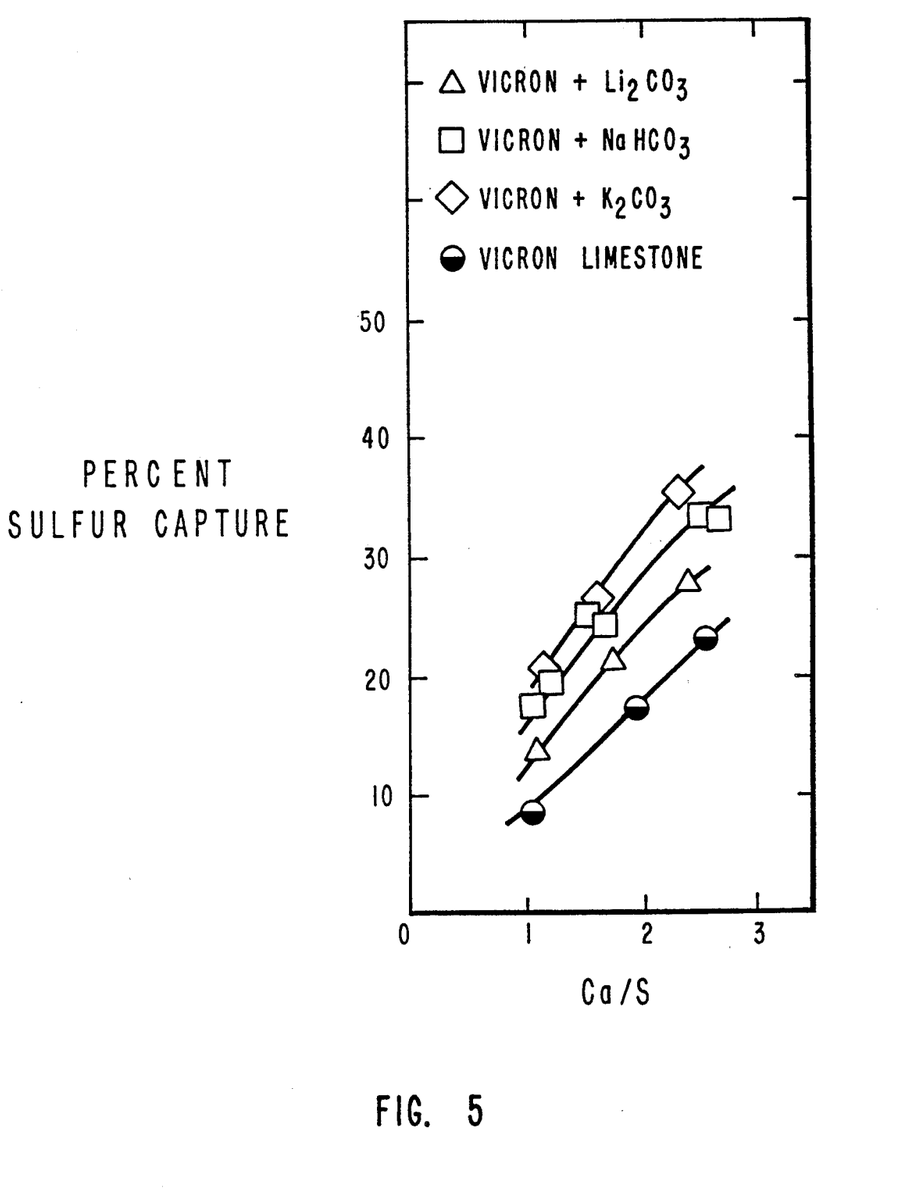
FIG. 5 is a graph illustrating $SO_x$ reduction efficiency by the addition of alkali metals to limestone.

An experiment is conducted similar to Example 1 with the exception that the $SO_x$ reduction efficiency of limestone ($CaCO_3$) is determined. It is found that the addition of alkali-metal compounds to limestone significantly enhanced the $SO_x$ reduction efficiencies. FIG. 5 presents these results.

From the foregoing, it will be appreciated that the present invention provides methods for controlling $N_2O$ emissions from stationary combustion systems having variable flue gas temperatures.

It will also be appreciated that the present invention could provide methods for controlling $N_2O$ emissions from stationary combustion systems while enlarging the useful temperature window and enhancing $NO_x$ reduction.

It will be further appreciated that the present invention provides methods for controlling $N_2O$ emissions from stationary combustion systems which allows one to treat flue gas with ammonia or ammonia precursors to reduce $NO_x$ emissions without producing an alternate class of pollutants such as $N_2O$.

It will be still further appreciated that the present invention provides methods for controlling $N_2O$ emissions from stationary combustion systems while enhancing $SO_x$ reduction.

It will be still further appreciated that the present invention provides methods for controlling $N_2O$ emissions from stationary combustion systems while enlarging the useful temperature window for $NO_x$ and $SO_x$ reduction.

It will be still further appreciated that the present invention provides methods for controlling $N_2O$ emissions from stationary combustion systems which are economically feasible.

It will be still further appreciated that the present invention provides methods for controlling $N_2O$ emissions from stationary combustion systems which perform effectively.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

What is claimed and desired to be secured by United States Letters Patents is:

1. A process for controlling $N_2O$ in effluent streams having temperature variations and containing $N_2O$ and excess oxygen, comprising the step of introducing an $N_2O$ control agent into the effluent stream at the point where the temperature of the effluent stream is in the range from about 1300° F. to about 3000° F., said $N_2O$ control agent being an alkaline compound of lithium, sodium, potassium, rubidium, cesium, francium, magnesium or calcium.

2. A process for controlling $N_2O$ in effluent streams as defined in claim 1, having temperature variations and containing $N_2O$ and excess oxygen, comprising the step of introducing an $N_2O$ control agent into the effluent stream at a point wherein the temperature of the effluent stream is in the range from about 1800° F. to about 2800° F.

3. A process for controlling $N_2O$ in effluent streams having temperature variations and containing $N_2O$ and excess oxygen as in claim 1, wherein the $N_2O$ control agent is introduced to the effluent stream to control $N_2O$ produced by the reaction of an $NO_x$ reducing agent in the effluent stream, said $NO_x$ reducing agent being ammonia and/or an ammonia precursor.

4. A process for controlling $N_2O$ in effluent streams as defined in claim 3, wherein the $NO_x$ reducing agent is a compound selected from the group consisting of ammonia, urea, ammonium oxalate, ammonium acetate, ammonium formate, ammonium bicarbonate, ammonium carbonate, and ammonium sulfate.

5. A process for controlling $N_2O$ in effluent streams as defined in claim 1, wherein the $N_2O$ control agent is an alkaline compound selected from the group consisting of alkaline-metal compounds of an organic acid, alkali-metal hydroxides, alkali-metal carbonates, and alkaline-earth metal compounds.

6. A process for controlling $N_2O$ in effluent streams as defined in claim 1, wherein the $N_2O$ control agent is a compound selected from the group consisting of NaOH, $Na_2SO_4$, $NaHSO_4$, $Na_2CO_3$, monosodium glutamate, potassium glutamate, sodium formate, potassium formate, sodium acetate, potassium acetate, LiOH, NaOH, KOH, lithium carbonate, lithium bicarbonate, sodium carbonate, sodium bicarbonate, potassium carbonate, potassium bicarbonate, CaO, $CaCO_3$, $Ca(OH)_2$, $Ca(COOH)_2$, $Ca(CH_3COO)_2$, MgO, $MgCO_3$, $Mg(OH)_2$, $Mg(COOH)_2$, and $Mg(CH_3COO)_2$.

7. A process for controlling $N_2O$ in effluent streams as defined in claim 1, wherein the $N_2O$ control agent is sodium glutamate.

8. A process for controlling $N_2O$ in effluent streams as defined in claim 1, wherein the $N_2O$ control agent is potassium glutamate.

9. A process for controlling $N_2O$ in effluent streams as defined in claim 1, wherein the $N_2O$ control agent is sodium formate.

10. A process for controlling $N_2O$ in effluent streams as defined in claim 1, wherein the $N_2O$ control agent is sodium acetate.

11. A process for controlling $N_2O$ in effluent streams as defined in claim 1, wherein the $N_2O$ control agent is potassium acetate.

12. A process for controlling $N_2O$ in effluent streams as defined in claim 1, wherein the $N_2O$ control agent is potassium formate.

13. A process for controlling $N_2O$ in effluent streams as defined in claim 1, wherein the $N_2O$ control agent is LiOH.

14. A process for controlling $N_2O$ in effluent streams as defined in claim 1, wherein the $N_2O$ control agent is NaOH.

15. A process for controlling $N_2O$ in effluent streams as defined in claim 1, wherein the $N_2O$ control agent is KOH.

16. A process for controlling $N_2O$ in effluent streams as defined in claim 1, wherein the $N_2O$ control agent is lithium carbonate.

17. A process for controlling $N_2O$ in effluent streams as defined in claim 1, wherein the $N_2O$ control agent is lithium bicarbonate.

18. A process for controlling $N_2O$ in effluent streams as defined in claim 1, wherein the $N_2O$ control agent is sodium carbonate.

19. A process for controlling $N_2O$ in effluent streams as defined in claim 1, wherein the $N_2O$ control agent is sodium bicarbonate.

20. A process for controlling $N_2O$ in effluent streams as defined in claim 1, wherein the $N_2O$ control agent is potassium carbonate.

21. A process for controlling $N_2O$ in effluent streams as defined in claim 1, wherein the $N_2O$ control agent is potassium bicarbonate.

22. A process for controlling $N_2O$ in effluent streams as defined in claim 1 wherein the $N_2O$ control agent is CaO.

23. A process for controlling $N_2O$ in effluent streams as defined in claim 1 wherein the $N_2O$ control agent is $CaCO_3$.

24. A process for controlling $N_2O$ in effluent streams as defined in claim 1 wherein the $N_2O$ control agent is $Ca(OH)_2$.

25. A process for controlling $N_2O$ in effluent streams as defined in claim 1 wherein the $N_2O$ control agent is $Ca(COOH)_2$.

26. A process for controlling $N_2O$ in effluent streams as defined in claim 1 wherein the $N_2O$ control agent is $Ca(CH_3COO)_2$.

27. A process for controlling $N_2O$ in effluent streams as defined in claim 1 wherein the $N_2O$ control agent is MgO.

28. A process for controlling $N_2O$ in effluent streams as defined in claim 1 wherein the $N_2O$ control agent is $MgCO_3$.

29. A process for controlling $N_2O$ in effluent streams as defined in claim 1 wherein the $N_2O$ control agent is $Mg(OH)_2$.

30. A process for controlling $N_2O$ in effluent streams as defined in claim 1 wherein the $N_2O$ control agent is $Mg(COOH)_2$.

31. A process for controlling $N_2O$ in effluent streams as defined in claim 1 wherein the $N_2O$ control agent is $Mg(CH_3COO)_2$.

32. A process for controlling $N_2O$ in effluent streams as defined in claim 1 wherein the $N_2O$ control agent is $Na_2SO_4$.

33. A process for controlling $N_2O$ in effluent streams as defined in claim 1 wherein the $N_2O$ control agent is $NaHSO_4$.

34. A process for controlling $N_2O$ in effluent streams as defined in claim 1, wherein the molar ratio of the alkali-metal or alkaline-earth metal in the control agent to $N_2O$ in the effluent stream is in the range from about 0.05:1 to about 1.5:1.

35. A process for controlling $N_2O$ in effluent streams as defined in claim 1, wherein the molar ratio of the alkali-metal or alkaline-earth metal in the control agent to $N_2O$ in the effluent stream is in the range from about 0.1:1 to about 0.5:1.

36. A process for controlling $N_2O$ in effluent streams as defined in claim 1, wherein the oxygen concentration in said effluent streams is in the range from about 0.1% to about 15%.

37. A process for controlling $N_2O$ in effluent streams as defined in claim 1, wherein the oxygen concentration in said effluent streams is in the range from about 2% to about 9%.

38. A process for controlling $N_2O$ in effluent streams as defined in claim 1, wherein the $N_2O$ control agent suppresses the formation of $N_2O$ emissions.

39. A process for controlling $N_2O$ in effluent streams as defined claim 1, wherein the $N_2O$ control agent significantly eliminates $N_2O$ emissions.

40. A process for reducing $NO_x$ while controlling the emission of $N_2O$ in effluent streams having temperature variations and containing $N_2O$, $NO_x$ and excess oxygen, comprising the steps of:
(a) introducing an $NO_x$ reducing agent into an effluent stream at a point where the temperature of the effluent stream is in the range from about 1300° F. to about 2000° F., said $NO_x$ reducing agent being ammonia and/or an ammonia precursor; and
(b) introducing an $N_2O$ control agent into the effluent stream at a point where the temperature of the effluent stream is in the range from about 1300° F. to about 3000° F., said $N_2O$ control agent being an alkaline compound of lithium, sodium, potassium, rubidium, cesium francium, magnesium or calcium.

41. A process for reducing $NO_x$ while controlling the emission of $N_2O$ in effluent streams as defined in claim 40, wherein the $N_2O$ control agent is an alkaline compound selected from the group consisting of alkaline-metal compounds of an organic acid, alkali-metal hydroxides, alkali-metal carbonates, and alkaline-earth metal compounds.

42. A process for reducing $NO_x$ while controlling the emission of $N_2O$ in effluent streams as defined in claim 40, wherein the $N_2O$ control agent is compound selected from the group consisting of NaOH, $Na_2SO_4$, $NaHSO_4$, $Na_2CO_3$, monosodium glutamate, potassium glutamate, sodium formate, potassium formate, sodium acetate, potassium acetate, LiOH, LaOH, KOH, lithium carbonate, lithium bicarbonate, sodium carbonate, sodium bicarbonate, potassium carbonate, potassium bicarbonate, CaO, $CaCO_3$, $Ca(OH)_2$, $Ca(COOH)_2$, $Ca(CH_3COO)_2$, MgO, $MgCO_3$, $Mg(OH)_2$, $Mg(COOH)_2$, and $Mg(CH_3COO)_2$.

43. A process for reducing $NO_x$ while controlling the emission of $N_2O$ in effluent streams as defined in claim 40, wherein the $N_2O$ control agent is introduced into the effluent stream to control the $N_2O$ emitted by the reaction of the $NO_x$ reducing agent in the effluent stream.

44. A process for reducing $NO_x$ while controlling the emission of $N_2O$ in effluent streams as defined in claim 40, wherein the $NO_x$ reducing agent is a compound selected from the group consisting of ammonia, urea, ammonium sulfate, ammonium carbonate, ammonium bicarbonate, ammonium formate, ammonium acetate, and ammonium oxalate.

45. A process for reducing $NO_x$ while controlling the emission of $N_2O$ in effluent streams as defined in claim 40, wherein the $N_2O$ control agent an the $NO_x$ reducing agent are injected at the same location.

46. A process for reducing $NO_x$ while controlling the emission of $N_2O$ in effluent streams as defined in claim 40, wherein the $N_2O$ control agent and the $NO_x$ reducing agent are mixed together and injected at the same location.

47. A process for reducing $NO_x$ while controlling the emission of $N_2O$ in effluent streams as defined in claim 40, wherein the $N_2O$ control agent and the $NO_x$ reducing agent are injected at separate locations.

48. A process for reducing $NO_x$ while controlling the emission of $N_2O$ in effluent streams as defined in claim 40, wherein the molar ratio of nitrogen in the $NO_x$ reducing agent to the $NO_x$ in the effluent stream is in the range from about 0.5:1 to about 5:1.

49. A process for reducing $NO_x$ while controlling the emission of $N_2O$ in effluent streams as defined in claim 40, wherein the molar ratio of nitrogen in the $NO_x$ reducing agent to the $NO_x$ in the effluent stream is in the range from about 1:1 to about 3:1.

50. A process for reducing $NO_x$ while controlling the emission of $N_2O$ in effluent streams as defined in claim 40, wherein the equivalent mole fraction of the alkali-metal or alkaline-earth metal in $N_2O$ control agent is in the range from about 5 to about 2000 ppm in the effluent stream.

51. A process for reducing $NO_x$ while controlling the emission of $N_2O$ in effluent streams as defined in claim 40, wherein the equivalent mole fraction of the alkali-metal or alkaline-earth metal in $N_2O$ control agent is in the range from about 50 to about 200 ppm in the effluent stream.

52. A process for reducing $NO_x$ while controlling the emission of $N_2O$ in effluent streams as defined in claim 40, wherein the oxygen concentration in said effluent streams is in the range from about 0.1% to about 15%.

53. A process for reducing $NO_x$ while controlling the emission of $N_2O$ in effluent streams as defined in claim 40, wherein the oxygen concentration in said effluent streams in the range from about 2% to about 9%.

54. A process for reducing $SO_x$ while controlling the emission of $N_2O$ in effluent streams containing $N_2O$, $XO_x$ and excess oxygen, comprising the steps of:
(a) introducing a $SO_x$ reducing agent into an effluent stream at a point where the temperature of the effluent stream is in the range from about 800° F. to about 3000° F., said $SO_x$ reducing agent being an alkaline-earth metal compound; and
(b) introducing a $N_2O$ control agent into the effluent stream at a point where the temperature of the effluent stream is in the range from about 1300° F. to about 3000° F., said $N_2O$ control agent being an alkaline compound of lithium, sodium, potassium, rubidium, cesium, francium, magnesium or calcium.

55. A process for reducing $SO_x$ while controlling the emission of $N_2O$ in effluent streams as defined in claim 54, wherein the $N_2O$ control agent is an alkaline compound selected from the group consisting of alkaline-metal compounds of an organic acid, alkali-metal hydroxides, alkali-metal carbonates, and alkaline-earth metal compounds.

56. A process for reducing $SO_x$ while controlling the emission of $N_2O$ in effluent streams as defined in claim 54, where the $N_2O$ control agent is a compound selected from the group consisting of NaOH, $Na_2SO_4$, $NaHSO_4$, $Na_2CO_3$, monosodium glutamate, potassium glutamate, sodium formate, potassium formate, sodium acetate, potassium acetate, LiOH, NaOH, KOH, lithium carbonate, lithium bicarbonate, sodium carbonate, sodium bicarbonate, potassium carbonate, potassium bicarbonate, CaO, CaCO$_3$, Ca(OH)$_2$, Ca(COOH)$_2$, Ca(CH$_3$COO)$_2$, MgO, MgCO$_3$, Mg(OH)$_2$, Mg(COOH)$_2$, and Mg(CH$_3$COO)$_2$.

57. A process for reducing SO$_x$ while controlling the emission of N$_2$O in effluent streams as defined in claim 54, wherein the N$_2$O control agent and the SO$_x$ reducing agent are injected at the same location.

58. A process for reducing SO$_x$ while controlling the emission of N$_2$O in effluent streams as defined in claim 54, wherein the N$_2$O control agent and the SO$_x$ reducing agent are mixed together and injected at the same location.

59. A process for reducing SO$_x$ while controlling the emission of N$_2$O in effluent streams as defined in claim 54, wherein the N$_2$O control agent and the SO$_x$ reducing agent are injected at separate locations.

60. A process for reducing SO$_x$ while controlling the emission of N$_2$O in effluent streams as defined in claim 54, wherein the molar ratio of the alkaline-earth metal in the SO$_x$ reducing agent to the SO$_x$ in the effluent stream is in the range from about 0.5:1 to about 5:1.

61. A process for reducing SO$_x$ while controlling the emission of N$_2$O in effluent streams as defined in claim 54, wherein the molar ratio of the alkaline-earth metal in the SO$_x$ reducing agent to the SO$_x$ in the effluent stream is in the range from about 1:1 to about 3:1.

62. A process for reducing SO$_x$ while controlling the emission of N$_2$O in effluent streams as defined in claim 54, wherein the equivalent mole fraction of the alkali metal in N$_2$O control agent is in the range from about 5 to about 2000 ppm, by volume, in the effluent stream.

63. A process for reducing SO$_x$ while controlling the emission of N$_2$O in effluent streams as defined in claim 54, wherein the equivalent mole fraction of the alkali metal in N$_2$O control agent is in the range from about 50 to about 200 ppm, by volume, in the effluent stream.

64. A process for reducing SO$_x$ while controlling the emission of N$_2$O in effluent streams as defined in claim 54, wherein the oxygen concentration in said effluent streams is in the range from about 0.1% to about 15%.

65. A process for reducing SO$_x$ while controlling the emission of N$_2$O in effluent streams as defined in claim 54, wherein the oxygen concentration in said effluent streams is in the range from about 2% to about 9%.

66. A process for reducing NO$_x$ and SO$_x$ while controlling the emission of N$_2$O in effluent streams having temperature variations and containing N$_2$O, NO$_x$, SO$_x$, and excess oxygen, comprising the steps of:
(a) introducing an NO$_x$ reducing agent into an effluent stream at a point where the temperature of the effluent stream is in the range from about 1300° F. to about 2000° F., said NO$_x$ reducing agent being ammonia and/or an ammonia precursor;
(b) introducing an SO$_x$ reducing agent into an effluent stream at a point where the temperature of the effluent stream is in the range from about 800° F. to about 3000° F., said SO$_x$ reducing agent being an alkaline-earth metal compound; and
(c) introducing an N$_2$O control agent into the effluent stream at a point where the temperature of the effluent stream is in the range from about 1300° F. to about 3000° F., said N$_2$O control agent being an alkaline compound selected from the group consisting of alkaline-metal compounds of an organic acid, alkali-metal hydroxides, alkali-metal carbonates, and alkaline-earth metal compounds.

67. A process for reducing NO$_x$ and SO$_x$ while controlling the emission of N$_2$O in effluent streams as defined in claim 66, wherein the N$_2$O control agent is introduced to the effluent stream to control N$_2$O produced by the reaction of the NO$_x$ reducing agent in the effluent stream.

68. A process for reducing NO$_x$ and SO$_x$ while controlling the emission of N$_2$O in effluent streams as defined in claim 66, wherein the NO$_x$ reducing agent is a compound selected from the group consisting of ammonia, urea, ammonium sulfate, ammonium carbonate, ammonium bicarbonate, ammonium formate, ammonium acetate, and ammonium oxalate.

69. A process for reducing NO$_x$ and SO$_x$ while controlling the emission of N$_2$O in effluent streams as defined in claim 66, wherein the NO$_x$ reducing agent, the N$_2$O control agent, and the SO$_x$ reducing agent are injected at the same location.

70. A process for reducing NO$_x$ and SO$_x$ while controlling the emission of N$_2$O in effluent streams as defined in claim 66, wherein the NO$_x$ reducing agent, the N$_2$O control agent, and the SO$_x$ reducing agent are mixed together and injected at the same location.

71. A process for reducing NO$_x$ and SO$_x$ while controlling the emission of N$_2$O in effluent streams as defined in claim 66, wherein the NO$_x$ reducing agent, the N$_2$O control agent, and the SO$_x$ reducing agent are injected at different locations.

72. A process for reducing NO$_x$ and SO$_x$ while controlling the emission of N$_2$O in effluent streams as defined in claim 66, wherein the NO$_x$ reducing agent and the N$_2$O control agent are injected at the same location but separate from the injection location of the SO$_x$ reducing agent.

73. A process for reducing NO$_x$ and SO$_x$ while controlling the emission of N$_2$O in effluent streams as defined in claim 66, wherein the SO$_x$ reducing agent and the N$_2$O control agent are injected at the same location but separate from the injection location of the NO$_x$ reducing agent.

74. A process for reducing NO$_x$ and SO$_x$ while controlling the emission of N$_2$O in effluent streams as defined in claim 66, wherein the SO$_x$ reducing agent and the NO$_x$ reducing agent are injected at the same location but separate from the injection location of the N$_2$O control agent.

75. A process for reducing NO$_x$ and SO$_x$ while controlling the emission of N$_2$O in effluent streams as defined in claim 66, wherein the molar ratio of nitrogen in the NO$_x$ reducing agent to the NO$_x$ in the effluent stream is in the range from about 0.5:1 to about 5:1.

76. A process for reducing NO$_x$ and SO$_x$ while controlling the emission of N$_2$O in effluent streams as defined in claim 66, wherein the molar ratio of the alkaline-earth metal in the SO$_x$ educing agent to the SO$_x$ in the effluent stream is in the range from about 0.5:1 to about 5:1.

77. A process for reducing NO$_x$ and SO$_x$ while controlling the emission of N$_2$O in effluent streams as defined in claim 66, wherein the equivalent mole fraction of the alkali metal in N$_2$O control agent is in the range from about 5 to about 2000 ppm, by volume, in the effluent stream.

78. A process for reducing NO$_x$ and SO$_x$ while controlling the emission of N$_2$O in effluent streams as defined in claim 66, wherein the oxygen concentration in said effluent streams is in the range from about 0.1% to about 15%.

* * * * *

UNITED STATES PATENT AND TRADEMARK OFFICE
CERTIFICATE OF CORRECTION

PATENT NO. : 5,270,025
DATED : December 14, 1993
INVENTOR(S) : LOC HO et al.

It is certified that error appears in the above-indentified patent and that said Letters Patent is hereby corrected as shown below:

Abstract, line 2, "Method" should be --Methods--
    Column 1, line 11, "Ser. No. 07/681,687" should be
--Ser. No. 07/681,697--
    Column 2, line 40, delete "e"
    Column 3, lines 14-15, after "temperature" insert --window may be shifted, the size of the temperature window is--
    Column 5, line 25, after "an" first occurrence insert --$SO_x$--
    Column 8, line 27, "comprising" should be --comprises--
    Column 9, line 65, after "occur" insert --are--
    Column 11, line 44, after "of" insert --the effluent stream is in the range from about 1300°F to about--.
    Column 12, line 63, after "was" insert --higher at the optimum temperature than the $NO_x$ reduction--
    Column 12, line 63, after "glutamate" insert --,--
    Column 15, line 12, "$NA_2CO_2$" should be $Na_2CO_3$
    Column 20, line 1, "an" should be --and--
    Column 20, line 44, "$XO_x$" should be --$SO_x$--

Signed and Sealed this

Twenty-third Day of August, 1994

Attest:

BRUCE LEHMAN

Attesting Officer      Commissioner of Patents and Trademarks